US008169893B1

(12) United States Patent
Getker (10) Patent No.: US 8,169,893 B1
(45) Date of Patent: May 1, 2012

(54) QUICK DETECTION OF PROBLEMATIC LINK TO SUPPORT FAST FAILOVER (75) Inventor: James Getker, Bradenton, FL (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 12/565,161

(22) Filed: Sep. 23, 2009

(51) Int. Cl.
*H04J 3/14* (2006.01)
*G06F 15/16* (2006.01)
(52) U.S. Cl. .................... 370/217; 370/241; 709/228
(58) Field of Classification Search .............. 370/216, 370/217, 245, 241; 709/224, 228
See application file for complete search history.

(56) References Cited

U.S. PATENT DOCUMENTS

| 7,355,982 | B2 | 4/2008 | Abe |
| 7,409,566 | B1* | 8/2008 | Diab ........................... 713/310 |
| 7,450,519 | B2 | 11/2008 | Yamauchi |
| 7,529,248 | B2 | 5/2009 | Konuma et al. |
| 7,570,591 | B2 | 8/2009 | Dove |
| 7,577,089 | B2 | 8/2009 | Varada et al. |
| 7,668,194 | B2 | 2/2010 | Chang et al. |
| 7,937,492 | B1* | 5/2011 | Kompella et al. ............. 709/239 |
| 2007/0159960 | A1* | 7/2007 | Schimke et al. ............. 370/216 |
| 2008/0215910 | A1* | 9/2008 | Gabriel et al. ................ 714/4 |
| 2009/0201821 | A1* | 8/2009 | Barnette et al. .............. 370/245 |
| 2010/0131660 | A1* | 5/2010 | Dec et al. ..................... 709/228 |

OTHER PUBLICATIONS

IEEE Computer Society, "Part 3: Carrier sense multiple access with Collision Detection (CSMA.CD) Access Method and Physical Layer Specifications", IEEE Std 802.3-2008 (Revision of IEEE 802.3-2005), Dec. 26, 2008, Section One, pp. 1-622.

IEEE Computer Society, "Part 3: Carrier sense multiple access with Collision Detection (CSMA.CD) Access Method and Physical Layer Specifications", IEEE Std 802.3-2008 (Revision of IEEE 802.3-2005), Dec. 26, 2008, Section Two, pp. 1-790.

IEEE Computer Society, "Part 3: Carrier sense multiple access with Collision Detection (CSMA.CD) Access Method and Physical Layer Specifications", IEEE Std 802.3-2008 (Revision of IEEE 802.3-2005), Dec. 26, 2008, Section Three, pp. 1-315.

IEEE Computer Society, "Part 3: Carrier sense multiple access with Collision Detection (CSMA.CD) Access Method and Physical Layer Specifications", IEEE Std 802.3-2008 (Revision of IEEE 802.3-2005), Dec. 26, 2008, Section Four, pp. 1-586.

IEEE Computer Society, "Part 3: Carrier sense multiple access with Collision Detection (CSMA.CD) Access Method and Physical Layer Specifications", IEEE Std 802.3-2008 (Revision of IEEE 802.3-2005), Dec. 26, 2008, Section Five, pp. 1-615.

* cited by examiner

*Primary Examiner* — Aung S Moe
*Assistant Examiner* — Awet Haile
(74) *Attorney, Agent, or Firm* — BainwoodHuang (57) ABSTRACT

A technique involves operating an electronic device having data communications ports. Each data communications port includes PHY circuitry to provide Physical Layer network functionality to the electronic device. The technique includes monitoring a particular PCS status signal from the PHY circuitry. The PCS status signal has (i) a PCS_OK value when a first data communications port is operating reliably in data mode and (ii) a PCS_NOT_OK value when the first data communications port is not operating reliably in data mode. The technique further includes detecting a transition event while monitoring the PCS status signal. The transition event involves the PCS status signal initially having the PCS_OK value and transitioning to having the PCS_NOT_OK value. The technique further includes, in response to detection of the transition event, outputting an electronic warning indication to enable failover from the first data communications port to a second data communications port.

18 Claims, 4 Drawing Sheets

QUICK DETECTION OF PROBLEMATIC LINK TO SUPPORT FAST FAILOVER

BACKGROUND

IEEE 802.3 is a collection of standards and proposed standards relating to the physical layer (i.e., the PHY layer or simply PHY), and the Media Access Control sublayer (i.e., the MAC) of the data link layer, for wire-based Ethernet. For example, IEEE 802.3-2008 describes 1000BASE-T and 10GBASE-T. Prior to IEEE 802.3-2008, an earlier description of 1000BASE-T was made available in IEEE 802.3-2005 and IEEE 802.3ab-1999. Similarly, an earlier description of 10GBASE-T was made available in IEEE 802.3an-2006.

In general, a MAC device and a PHY device are associated with each port of a data communications device. The MAC device generally handles generating and parsing physical frames of data. Furthermore, the PHY device generally handles moving the data to and from the wire.

A processor typically queries the PHY device for link status to determine whether a link is up or down. In particular, if the PHY device returns a LINK_UP value, the processor considers the link to be up. However, if the PHY returns a LINK_DOWN value, the processor considers the link to be down and can take remedial steps to maintain reliable network operation such as utilizing a different network path to convey information between two end devices.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Unfortunately, there are deficiencies in relying on a PHY device's link status to maintain reliable network operation. In particular, the amount of time for the PHY device's link status to change from the LINK_UP value to the LINK_DOWN value may be too long to accommodate certain protocols which aim to provide quick rerouting. For example, in the context of 1000BASE-T, IEEE 802.3-2008 imposes a time delay of at least 350 milliseconds after the Physical Coding Sublayer (PCS) status becomes unstable before the PHY device is allowed to transition its link status from the LINK_UP value to the LINK_DOWN value. Similarly, in the context of 10GBASE-T, IEEE 802.3-2008 imposes a time delay of at least 2000 milliseconds after the PCS status becomes unstable before PHY device is allowed to transition its link status from the LINK_UP value to the LINK_DOWN value. Such relatively large amounts of time may provide a high degree of network tolerance by allowing a link to recover and thus avoid more complicated operations such as forming new network paths. However, such operation results in excess delay in reaction time (e.g., prevents fast failover) when a link (or node) does not recover.

In contrast to the above-described conventional approach which relies on a PHY's identified link status (i.e., LINK_UP vs. LINK_DOWN) to maintain reliable network operation, improved techniques involve monitoring a particular Physical Coding Sublayer (PCS) status signal from PHY circuitry. In particular, upon detection of a transition event which involves the particular PCS status signal initially having a PCS_OK value and transitioning to having a PCS_NOT_OK value, an electronic warning indication can be outputted to enable failover from a problematic first data communications port to a second data communications port. In particular, the electronic warning indication can be used as a trigger for a link switchover operation to maintain fast network responsiveness, to adjust a Label Switched Path (LPS) for Fast Re-Routing (FRR), Rapid Re-Routing (RRR), etc.

One embodiment is directed to a technique of operating an electronic device having data communications ports. Each data communications port includes PHY circuitry to provide Physical Layer network functionality to the electronic device. The technique includes monitoring a particular PCS status signal from the PHY circuitry. The PCS status signal has (i) a PCS_OK value when a first data communications port is operating reliably in data mode and (ii) a PCS_NOT_OK value when the first data communications port is not operating reliably in data mode. The technique further includes detecting a transition event while monitoring the PCS status signal. The transition event involves the PCS status signal initially having the PCS_OK value and transitioning to having the PCS_NOT_OK value. The technique further includes, in response to detection of the transition event, outputting an electronic warning indication to enable failover from the first data communications port to a second data communications port.

Description of Example Embodiments

Figure 1:
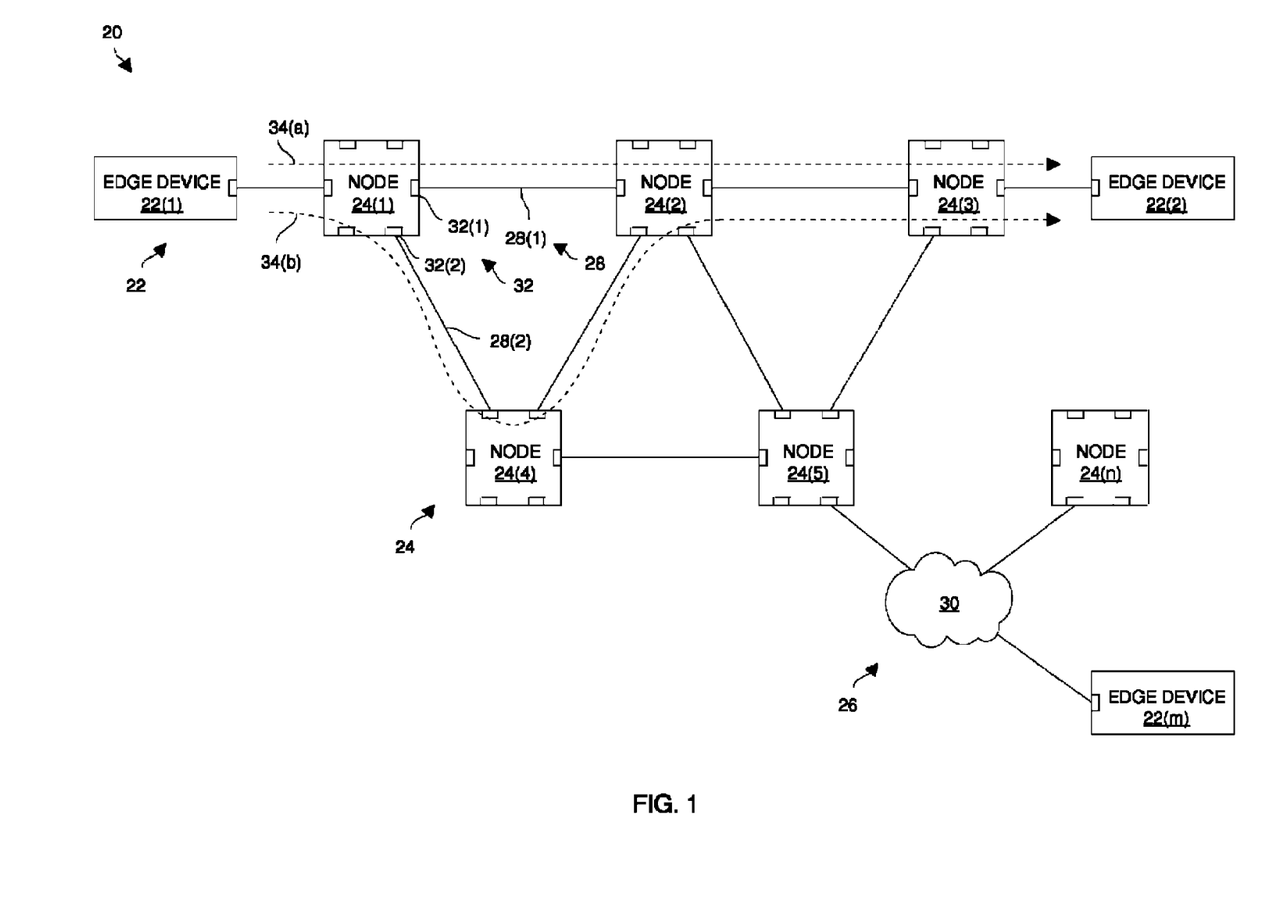
FIG. 1 is a diagram of a network environment having at least one electronic device which monitors a PCS status signal from PHY circuitry to enable failover from a problematic first data communications port to a second data communications port.

FIG. 1 shows a network environment 20 having devices which monitor a PCS status signal from PHY circuitry for quick detection of a problematic link and fast failover. The network environment 20 includes a set of edge devices 22(1), 22(2), . . . , 22(m) (collectively, edge devices 22), a set of intermediate node devices 24(1), 24(2), 24(3), 24(4), 24(5), . . . , 24(n) (collectively, nodes 24), and a communications medium 26 which connects the edge devices 22 and the nodes 24 together.

The communications medium 26 includes copper-based (or wire-based) conductive segments 28 (e.g., cables, adapters, connectors, etc.). For example, a copper-based segment 28(1) connects the node 24(1) to the node 24(2). Similarly, a copper-based segment 28(2) connects the node 24(1) to the node 24(4), and so on. Four pair Ethernet cabling (e.g., CAT 5, CAT 5e, CAT 6, etc.) among other types of twisted pair cabling is suitable for use in at least some of the segments 28.

As illustrated by the network cloud 30, the communications medium 26 may include other types of data communications devices and network components as well (e.g., bridges, gateways, fiber optic devices and cables, wireless devices, etc.). Moreover, the particular node configuration shown in FIG. 1 is provided by way of example only, and other topologies/layouts are suitable for use as well.

As shown in FIG. 1, each node 24 includes at least one data communications port 32 which connects to the communications medium 26. For example, the node 24(1) includes a first data communications port 32(1) which connects to the segment 28(1), a second data communications port 32(2) which connects to the segment 28(2), and so on.

During operation, the nodes 24 perform routing and/or switching operations which form communications pathways 34 between the edge devices 22. For example, the dashed arrow 34(a) illustrates a first pathway between the edge device 22(1) and the edge device 22(2). The dashed arrow 34(b) illustrates an alternative pathway between the edge device 22(1) and the edge device 22(2).

As will be explained in further detail shortly, the nodes 24 identify situations in which links become usable at least temporarily. In these situations, the nodes 24 are constructed and arranged to carry out fast failovers to new links (i.e., the nodes 24 adjust the communications pathways 34) to maintain reliable connectivity between the edge devices 22. Such failovers involve a node 24 detecting a problematic link associated with a first data communications port 32 and switching over to another link associated with a second data communications port 32 to provide resilient network behavior such as Fast Re-Routing (FRR) and Rapid Re-Routing (RRR).

In some arrangements, at least a portion of the network environment 20 implements various networking protocols such as Multiprotocol Label Switching (MPLS). In certain MPLS arrangements, the edge devices 22 operate as Customer Edge (CE) devices, and the nodes 24 operate as Label Switch Routers (LSRs). Upon a link or node failure, one or more nodes 24 switchover ports to ensure that a Label Switched Path (LSP) exists between two communicating edge devices 22. Further details will now be provided with reference to FIG. 2.

Figure 2:
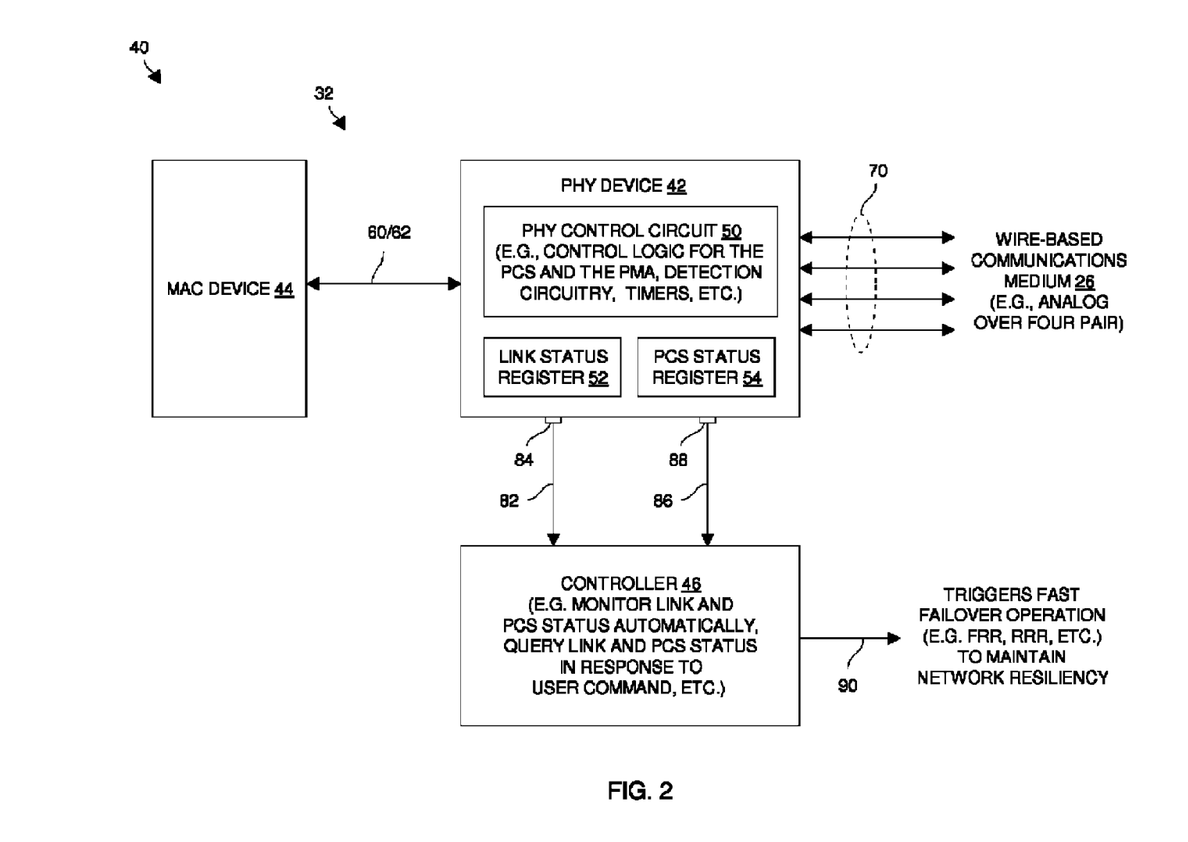
FIG. 2 is a diagram of a portion of an electronic device of FIG. 1 in accordance with a first embodiment.

FIG. 2 shows circuitry 40 which is associated with each port 32 of a node 24 (also see FIG. 1) in accordance with a first embodiment. The circuitry 40 includes a PHY device 42, a MAC device 44, and a controller 46. The PHY device 42 includes, among other things, a PHY control circuit 50, a link status register 52 to hold link status, and a PCS status register 54 to hold real-time status of the Physical Coding Sublayer. In some arrangements, the controller 46 includes processing circuitry (e.g., a set of processors or microprocessors executing instructions) which communicates with multiple ports 32 of the node 24.

During operation, the MAC device 44 exchanges control/status signals 60 and data signals 62 with the PHY device 42. For example, in the context of 10GBASE-T, the MAC device 44 communicates with the PHY device 42 through an XGMII (10 Gigabit Media Independent Interface). Other data communications circuitry which interfaces with the MAC device to move data through to other ports 32 is omitted from FIG. 2 for simplicity.

The PHY control circuit 50 includes, among other things, control logic for the Physical Coding Sublayer and the Physical Medium Attachment PMA sublayer, detection circuitry, timers, and so on. With such provisioning, the PHY control circuit 50 exchanges data signals 70 with the communications medium 26 (also see FIG. 1) when the link from the port 32 is up. Additionally, the PHY control circuit 50 continuously makes operational status information accessible to the controller 46.

In particular, the PHY control circuit 50 provides a link status signal 82 having (i) a LINK_OK value when the PHY control circuit 50 considers the link to be up (i.e., when the link is usable or when the PHY control circuit 50 is operating within a predefined time period in which the link is expected to recover), and (ii) a LINK_NOT_OK value when the PHY control circuit 50 considers the link to be down (i.e., when the link is not usable and the predefined time period in which the link is expected to recover has passed). The LINK_OK and LINK_NOT_OK values can take the form of distinct binary/logical numbers (e.g., "0" vs. "1"), voltages, or other distinguishable waveforms or signal types. In some arrangements, the controller 46 obtains the link status signal 82 by measuring an output conductor 84 (e.g., a pad or pin) of the PHY device 42. In other arrangements, the LINK_OK and LINK_NOT_OK values are stored in the link status register 52, and the controller 52 routinely reads the contents of the link status register 52 to obtain the status of the link.

While the PHY control circuit 50 provides the link status signal 82, the PHY control circuit 50 simultaneously provides a PCS status signal 86 having (i) a PCS_OK value when the PHY control circuit 50 considers the PCS to be fully operational (i.e., when the data communications port 32 is operating reliably in data mode), and (ii) a PCS_NOT_OK value when the PHY control circuit 50 considers the PCS not to be fully operational (i.e., when the data communications port 32 is not operating reliably in data mode). The PCS_OK and PCS_NOT_OK values can take the form of distinct digital numbers, voltages, or other distinguishable waveforms or signal types. In some arrangements, the controller 46 obtains the PCS status signal 86 by measuring an output conductor 88 (e.g., a pad or pin) of the PHY device 42. In other arrangements, the PCS_OK and PCS_NOT_OK values are stored in the PCS status register 54, and the controller 46 periodically reads the contents of the PCS status register 54 to obtain the status.

It should be understood that various portions of the IEEE 802.3 documentation define details of how PCS operation can be determined. In particular, in some implementations, the IEEE 802.3 documentation sets forth the criteria for identifying when the PCS is operating reliably in data mode, and when the PCS is not operating reliably in data mode. For example, descriptions for the PCS for 1000BASE-T and 10GBASE-T are available in IEEE 802.3-2008, the teachings of which are hereby incorporated by reference in their entirety.

It should be further understood that the current value of the link status signal 82 provides an accurate real-time representation of the PHY's view of the link. That is, the current value of the link status signal 82 indicates whether the PHY control circuit 50 considers the link to be up or down. As such, a user (e.g., a network administrator, a technician, etc.) is able to check the current value of the link status signal 82 by sending a user query (e.g., a command) to the controller 46. The controller 46 responds to the user query by reading the link status signal 82 from the PHY device 42 and outputting its value to the user, i.e., outputting a result signal/indication to the user.

Furthermore, the current value of the PCS status signal 86 indicates whether the PCS is in a fully operational state, e.g., the PCS is operating reliably in data mode vs. the PCS is not operating reliably in data mode. It should be understood that the real-time PCS status provided by the PCS status signal 86 (i.e., the real-time status of the copper link) is distinct from the link state identified by the link status signal 82.

In some situations, the PHY control circuit 50 may consider the link to be bad although the PHY control circuit 50 has not changed the value of the link status signal 82 to indicate that the link is down. For example, the PHY control circuit 50 may have switched the PCS status signal 86 from initially having the PCS_OK value to the PCS_NOT_OK value, and may be waiting a predetermined amount of time for the link to possibly recover before deeming the link to have failed. During this period of time, the controller 46 has immediate knowledge of the link being bad due to receipt of the PCS status signal 86.

Details of the operation of the controller 46 will now be explained in further detail. The controller 46 monitors the PCS status signal 86 in an ongoing manner and, upon detection of a state transition from PCS_OK to PCS_NOT_OK, allows a PCS status debounce time pass before deeming a transition event to have occurred. If the PCS status signal 86 returns to having the PCS_OK value at the end of this debounce time, the controller 46 ignores the state transition and deems no transition event to have occurred. However, if the PCS status signal 86 still has the PCS_NOT_OK value at the end of this debounce time, the controller 46 considers a transition event to have occurred, and outputs an electronic indication 90 (e.g., an output signal having a particular value or waveform) in response to the transition event.

The PCS status debounce time (e.g., 50 milliseconds) is substantially shorter than the link status debounce time (e.g., 350-700 milliseconds for 1000BASE-T, 2000 milliseconds for 10GBASE-T, etc.). Accordingly, the controller 46 is able to begin a failover operation much sooner than if the controller 46 had to wait for a change in link status identified by the PHY control circuit 50. As a result, network resiliency features such as Fast Re-Routing (FRR) and Rapid Re-Routing (RRR) can be implemented within the network environment 20 and triggered off of the electronic indication 90.

For example, in the context of LPS, suppose that the communications pathway 34(a) initially exists between the edge devices 22(1) and 22(2) (also see FIG. 1). That is, a Labeled Switch Path exists between the edge devices 22(1) and 22(2) through nodes 24(1), 24(2) and 24(3).

Now, further suppose that a failure occurs in the segment 28(1). In this situation, the controller 46 of the node 24(1), which monitors the segment 28(1) through data communications port 32(1), detects the failure and starts a timer to measure the PCS status debounce time.

Immediately after expiration of the PCS status debounce time (e.g., 50 milliseconds) rather than after the expiration of the link status debounce time (e.g., 2000 milliseconds for 10GBASE-T), the controller 46 of the node 24(1) deems the transition event to have occurred. The controller 46 then outputs the electronic indication 90 to start a fast failover operation. In particular, the controller 46 switches from data communications port 32(1) connected to segment 28(1) to new data communications port 32(2) connected to segment 28(2). Accordingly, the controller 46 is able to effectively replace the communications pathway 34(a) with the bypass communications pathway 34(b) thus effectively adjusting the LPS topology in an extremely short amount of time. In some situations, the path is adjusted in compliance with MPLS and happens before the link status signal 82 has transitioned its state, i.e., before the link status signal 82 transitions from having the LINK_OK value to having the LINK_NOT_OK value.

It should be understood that, in some arrangements, the PHY control circuit 50 updates the information in the link status register 52 depending on the current PCS status. That is, circuitry within the PHY determines whether the link status signal 82 has the LINK_UP value or the LINK_DOWN value based on whether and how long PCS status is PCS_OK or PCS_NOT_OK. For example, in the context of 10GBASE-T (also see IEEE 802.3-2008), the PCS status must be PCS_NOT_OK for at least 2000 milliseconds before the link status transitions from LINK_UP to LINK_DOWN.

It should be further understood that the nodes 22 typically include multiple data communications ports 32 which are under control of a single (i.e., shared) controller 46 or which have dedicated controllers 46. In either situation, the nodes 22 are constructed and arranged to quickly detect a problematic link in any of the ports 32 and performing a fast failover operation by switching from the problematic port 32 to a new non-problematic port 32. That is, the links of each node 24 are monitored for potential switchover. Such operation is well-suited for certain protocols which require fast failover capabilities such as MPLS. Further details will now be provided with reference to FIG. 3.

Figure 3:
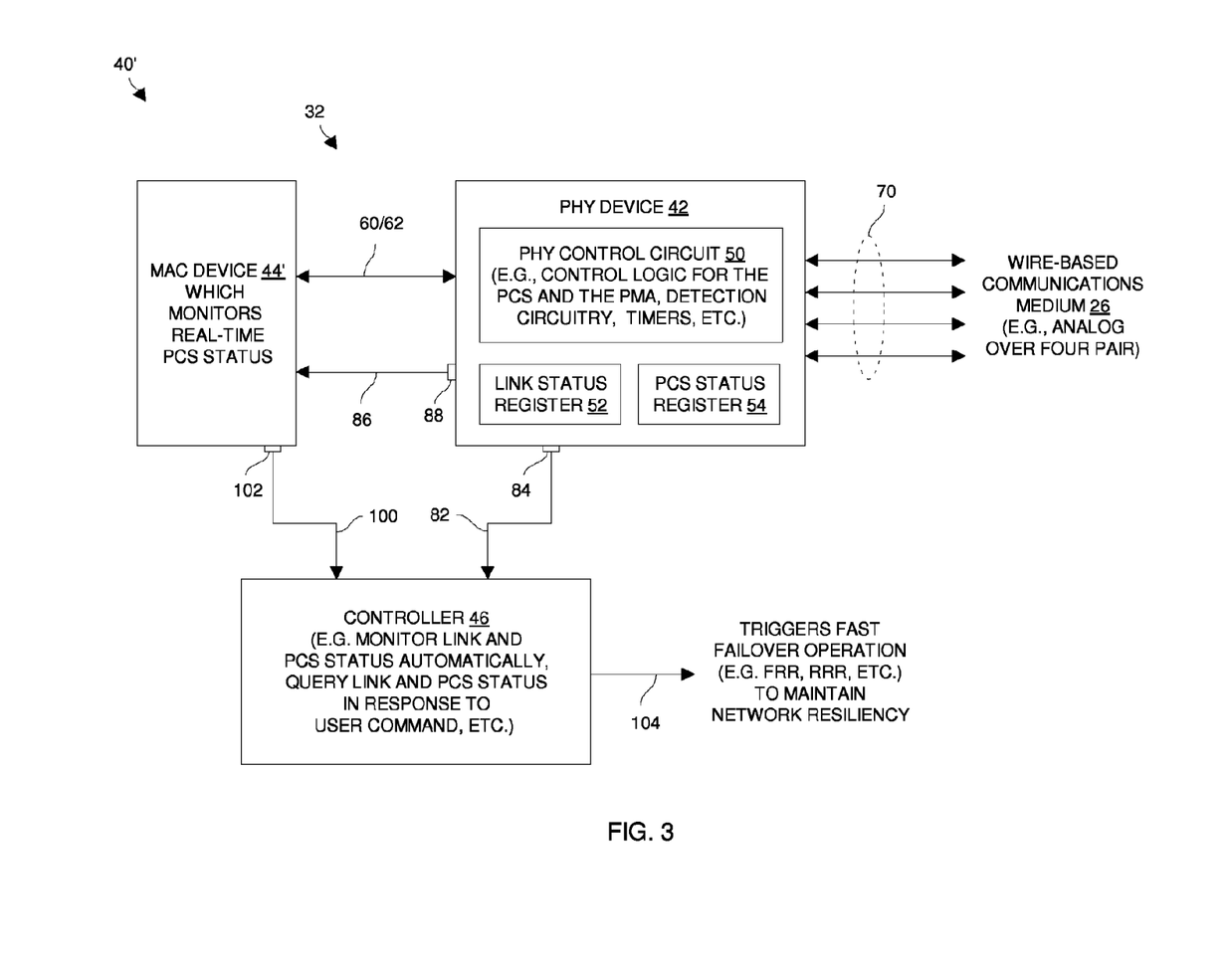
FIG. 3 is a diagram of a portion of an electronic device of FIG. 1 in accordance with a second embodiment.

FIG. 3 shows circuitry 40' which is associated with each port 32 of a node 24 in accordance with a second embodiment. The circuitry 40' is similar to the circuitry 40 described above (also see FIG. 2). However, the circuitry 40' includes a MAC device 44' which is constructed and arranged to monitor real-time PCS status. That is, the MAC device 44' receives the earlier-described PCS status signal 86 from the output conductor 88 of the PHY device 42. The MAC device 44' outputs an alarm signal 100 to the controller 46 from an output conductor 102 when the MAC device 44' determines that the copper-link of the port 32 has gone bad.

Ideally, the MAC device 44' factors the PCS debounce time into the alarm signal 100. That is, the alarm signal 100 indicates that the link is bad only when the PCS status signal 86 transitions from the PCS_OK value to the PCS_NOT_OK value and when the PCS status signal 86 still has the PCS_NOT_OK value after the PCS debounce time has expired.

Upon receipt of the alarm signal 100 from the MAC device 44', the controller 46 deems the transition event to have occurred. The controller 46 then outputs an electronic indication 104 to start a fast failover operation. For example, in a manner similar to that described above in connection with FIGS. 1 and 2, the controller 46 performs a port switchover operation to support FRR or RRR (e.g., see the bypass communications pathway 34(b) in FIG. 1). The electronic indication 104 is similar to the electronic indication 90 (see FIG. 2) except that the electronic indication 104 is based on the alarm signal 100 from the MAC device 44' rather than the PCS status signal 86 taken directly from the PHY device 42. Nevertheless, the controller 46 is able to trigger a fast failover operation to maintain network reliability, e.g., to adjust a Label Switched Path (see pathways 34(a) and 34(b) in FIG. 1).

Although it was described above that the MAC device 44' factors the PCS debounce time into the alarm signal 100, it should be understood that, in alternative arrangements, the MAC device 44' simply duplicates the current information contained in the PCS status signal 86 in the alarm signal 100. That is, the signals 86, 100 move substantially in parallel thus enabling the controller 46 to receive real-time PCS status through the MAC device 44'. Further details will now be provided with reference to FIG. 4.

Figure 4:
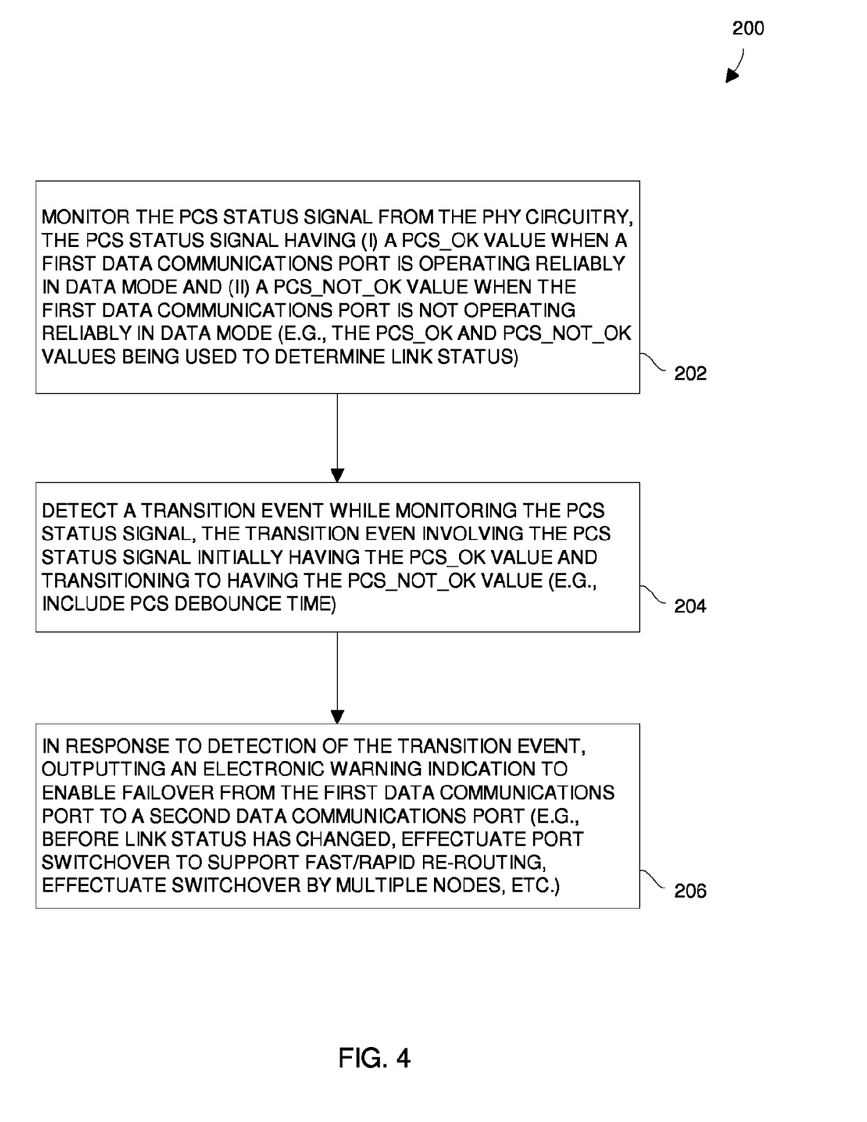
FIG. 4 is a flowchart of a procedure which is performed by an electronic device of FIG. 1.

FIG. 4 shows a procedure 200 which is performed by circuitry of an electronic device to enable the electronic device to quickly detect a problematic link and perform a fast failover operation. In particular, within each node 24 of the network environment 20 (also see FIG. 1), the procedure 200 is performed for each data communications port 32 of that node 24.

In step 202, the circuitry monitors a particular PCS status signal 86 from the PHY device 42 corresponding to a data communications port 32. The PCS status signal has (i) a PCS_OK value when that port 32 is operating reliably in data mode and (ii) a PCS_NOT_OK value when the that port 32 is not operating reliably in data mode. Such monitoring may involve receiving the PCS status signal 86 directly from the PHY device 42 (FIG. 2) or sampling an alarm signal 100 from the MAC device 44' to indirectly obtain PCS status (FIG. 3).

In step 204, the circuitry detects a transition event while monitoring the particular PCS status signal 86. The transition event involves the particular PCS status signal 86 initially having the PCS_OK value and transitioning to having the PCS_NOT_OK value. In some arrangements, the circuitry allows for a PCS debounce time (e.g., 50 milliseconds) which is substantially shorter that the amount of time prescribed for possible link recovery (e.g., 2000 milliseconds for 10GBASE-T as imposed by IEEE 802.3-2008).

In step 206, the circuitry outputs an electronic warning indication (see arrow 90 in FIG. 2 and arrow 104 in FIG. 3) in response to detection of the transition event, i.e., real-time PCS status change indicating that the link has become unusable. The electronic warning indication enables the circuitry of the node 24 to carry out a failover operation by switching data communications ports 32 (e.g., see ports 32(1) and 32(2) and their associated pathways 34(a) and 34(b)).

As described above, an improved technique involves monitoring a PCS status signal 86 from a PHY device 42. In particular, upon detection of a transition event which involves the PCS status signal 86 initially having a PCS_OK value and transitioning to having a PCS_NOT_OK value, an electronic warning indication 90, 104 can be outputted to enable failover from a problematic first data communications port 32(1) to a second data communications port 32(2). In particular, the electronic warning indication 90, 104 can be used as a trigger for fast failover from a primary Ethernet link to a backup Ethernet link.

While various embodiments of the invention have been particularly shown and described, it will be understood by those skilled in the art that various changes in form and details may be made therein without departing from the spirit and scope of the invention as defined by the appended claims.

For example, a bypass communications pathway 34(b) was described above as being formed in response to a failure of a copper segment 28(1) (also see FIG. 1). The network environment 20 is capable of fast failover due to other types of failures as well. For instance, if the node 24(2) were to fail, the remaining nodes 24 are capable of working together to form a bypass communications pathway 34 between edge devices 22(1), 22(2). Such an operation involves coordination among nodes 24(1), 24(4), 24(5) and 24(3), and can be effectuated by the electronic indication obtained from port 32(1) of the node 24(1). Such participation by multiple nodes 24 to adjust pathways 34 (e.g., in the LPS context) is intended to belong to various embodiments.

What is claimed is:

1. A method of operating an electronic device having data communications ports, the method comprising:
    monitoring a particular Physical Coding Sublayer (PCS) status signal from Physical Layer (PHY) circuitry of a first data communications port of the electronic device, each data communications port including respective PHY circuitry to provide Physical Layer network functionality to the electronic device, the particular PCS status signal having (i) a PCS_OK value when the first data communications port is operating reliably in data mode and (ii) a PCS_NOT_OK value when the first data communications port is not operating reliably in data mode;
    generating a link status signal indicative of a status of a link of the first data communications port, the link status signal having a LINK_UP value indicative of the link being up and a LINK_DOWN value indicative of the link being down;
    detecting a transition event while monitoring the particular PCS status signal, the transition event involving the particular PCS status signal initially having the PCS_OK value and transitioning to having the PCS_NOT_OK value; and
    in response to detection of the transition event, outputting an electronic warning indication to enable failover from the first data communications port to a second data communications port,
    wherein detecting the transition event includes (i) identifying a change in the particular PCS signal from the PCS_OK value to the PCS_NOT_OK value, (ii) after identifying the change, waiting a predetermined amount of time, and (iii) concluding that the transition event has occurred when the particular PCS status signal is still at the PCS_NOT_OK value after waiting the predetermined amount of time, and that the transition event has not occurred when the particular PCS status signal is back at the PCS_OK value after waiting the predetermined amount of time;
    wherein the electronic warning indication is outputted after the particular PCS status signal changes from the PCS_OK value to the PCS_NOT_OK value but before the link status signal transitions from the LINK_UP value to the LINK_DOWN value.

2. A method as in claim 1 wherein a particular link status signal of the PHY circuitry of the first data communications port has (i) a LINK_OK value when the particular PCS status signal has the PCS_NOT_OK value for less than a predetermined amount of time, and (ii) a LINK_NOT_OK value when the particular PCS status signal has the PCS_NOT_OK value for at least the predetermined amount of time; and wherein the method further comprises:
    receiving a user query to check the particular link status signal of the PHY circuitry of the first data communications port, and
    in response to the user query, outputting a query result signal indicating that a link of the first data communications port is (i) up when the particular link status signal has the LINK_OK value, and (ii) down when the particular link status signal has the LINK_NOT_OK value.

3. A method as in claim 2 wherein outputting the electronic warning indication includes:
    providing the electronic warning indication before the particular link status signal transitions from having the LINK_OK value to having the LINK_NOT_OK value.

4. A method as in claim 3 wherein a first communications pathway initially existed from the first communications port to an external network node; and wherein the method further comprises:
    replacing the first communications pathway with a bypass communications pathway from the second communications port to the external network node in response to the electronic warning indication.

5. A method as in claim 4 wherein replacing the first communications pathway with the bypass communications pathway includes:
    establishing the bypass communications pathway from the second communications port to the external network node before the particular link status signal transitions from having the LINK_OK value to having the LINK_NOT_OK value.

6. A method as in claim 5 wherein establishing the bypass communications pathway from the second communications port to the external network node includes adjusting a topology of a Label Switched Path (LSP) which includes the electronic device and the external network node.

7. A method as in claim 4 wherein both the first communications pathway and the bypass communications pathway are copper-based pathways.

8. A method as in claim 4 wherein a link associated with the second data communications port has a nominal data rate of 10 Gigabits per second.

9. A method as in claim 1 wherein monitoring the particular PCS status signal from the PHY circuitry of the first data communications port includes:
periodically reading a PCS status bit from a register of the PHY circuitry of the first data communications port.

10. A method as in claim 1 wherein monitoring the particular PCS status signal from the PHY circuitry of the first data communications port includes:
sampling an alarm signal from an output of Media Access Control (MAC) circuitry coupled to the PHY circuitry of the first data communications port, the MAC circuitry being configured to provide MAC layer network functionality to the electronic device.

11. A method as in claim 1 wherein a link associated with the first data communications port has a nominal data rate of 10 Gigabits per second; and
wherein the predetermined amount of time is substantially less than 2 seconds.

12. A method as in claim 1 wherein the predetermined amount of time is substantially 50 milliseconds.

13. A method as in claim 1, wherein a first communications pathway initially existed from the first communications port to an external network node, and wherein the method further comprises, in response to the electronic warning indication, replacing the first communications pathway with a bypass communications pathway from the second communications port to the external network node.

14. An electronic device, comprising:
a set of data communications ports, each data communications port including Physical Layer (PHY) circuitry to provide Physical Layer network functionality to the electronic device; and
a controller electrically coupled to the set of data communications ports, the controller being configured to:
monitor a particular Physical Coding Sublayer (PCS) status signal from the PHY circuitry, the particular PCS status signal having (i) a PCS_OK value when a first data communications port is operating reliably in data mode and (ii) a PCS_NOT_OK value when the first data communications port is not operating reliably in data mode,
generate a link status signal indicative of a status of a link of the first data communications port, the link status signal having a LINK_UP value indicative of the link being up and a LINK_DOWN value indicative of the link being down;
detect a transition event while monitoring the particular PCS status signal, the transition event involving the particular PCS status signal initially having the PCS_OK value and transitioning to having the PCS_NOT_OK value, and
in response to detection of the transition event, outputting an electronic warning indication to enable failover from the first data communications port to a second data communications port,
wherein the controller, when detecting the transition event, is configured to (i) identify a change in the particular PCS signal from the PCS_OK value to the PCS_NO-T_OK value, (ii) after identifying the change, wait a predetermined amount of time, and (iii) conclude that the transition event has occurred when the particular PCS status signal is still at the PCS_NOT_OK value after waiting the predetermined amount of time, and that the transition event has not occurred when the particular PCS status signal is back at the PCS_OK value after waiting the predetermined amount of time, and
wherein the electronic warning indication is outputted after the particular PCS status signal changes from the PCS_OK value to the PCS_NOT_OK value but before the link status signal transitions from the LINK_UP value to the LINK_DOWN value.

15. The electronic device as in claim 14 wherein a particular link status signal of the PHY circuitry has (i) a LINK_OK value when the particular PCS status signal has the PCS_NOT_OK value for less than The predetermined amount of time, and (ii) a LINK_NOT_OK value when the particular PCS status signal has the PCS_NOT_OK value for at least the predetermined amount of time; and wherein the controller is further configured to:
receive a user query to check the particular link status signal of the PHY circuitry, and
in response to the user query, output a query result signal indicating that a link of the first data communications port is (i) up when the particular link status signal has the LINK_OK value, and (ii) down when the particular link status signal has the LINK_NOT_OK value.

16. A computer program product for use by a computerized apparatus having multiple data communications ports, the computer program product including a non-transitory computer readable medium having instructions which, when performed by the computerized apparatus, direct the computerized apparatus to:
monitor a particular Physical Coding Sublayer (PCS) status signal from Physical Layer (PHY) circuitry of a first data communications port of the computerized apparatus, each data communications port including respective PHY circuitry to provide Physical Layer network functionality to the computerized apparatus, the particular PCS status signal having (i) a PCS_OK value when the first data communications port is operating reliably in data mode and (ii) a PCS_NOT_OK value when the first data communications port is not operating reliably in data mode;
generate a link status signal indicative of a status of a link of the first data communications port, the link status signal having a LINK_UP value indicative of the link being up and a LINK_DOWN value indicative of the link being down,
detect a transition event, the transition event involving the particular PCS status signal initially having the PCS_OK value and transitioning to having the PCS_NOT_OK value; and
in response to detection of the transition event, output an electronic warning indication to enable failover from the first data communications port to a second data communications port,
wherein detecting the transition event includes (i) identifying a change in the particular PCS signal from the PCS_OK value to the PCS_NOT_OK value, (ii) after identifying the change, waiting a predetermined amount of time, and (iii) concluding that the transition event has occurred when the particular PCS status signal is still at the PCS_NOT_OK value after waiting the predetermined amount of time, and that the transition event has not occurred when the particular PCS status signal is back at the PCS_OK value after waiting the predetermined amount of time, and wherein the electronic warning indication is outputted after the particular PCS status signal changes from the PCS_OK value to the PCS_NOT_OK value but before the link status signal transitions from the LINK_UP value to the LINK_DOWN value.

17. A computer program product as in claim 16 wherein monitoring the particular PCS status signal from the PHY circuitry of the first data communications port includes:
periodically reading a PCS status bit from a register of the PHY circuitry of the first data communications port.

18. A computer program product as in claim 16 wherein monitoring the particular PCS status signal from the PHY circuitry of the first data communications port includes:
sampling an alarm signal from an output of Media Access Control (MAC) circuitry coupled to the PHY circuitry, the MAC circuitry being configured to provide MAC layer network functionality to the electronic device.

* * * * *